United States Patent
Wang et al.

(10) Patent No.: US 8,570,764 B2
(45) Date of Patent: Oct. 29, 2013

(54) BACKPLANE AND BACKPLANE COMMUNICATION SYSTEM

(75) Inventors: Hui Wang, Nanjing (CN); Zhigao Deng, Shenzhen (CN); Tao Yu, Chengdu (CN); Qian Deng, Shenzhen (CN); Hua Xu, Milan (IT); Meihan Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 13/234,749

(22) Filed: Sep. 16, 2011

(65) Prior Publication Data

US 2012/0002378 A1  Jan. 5, 2012

Related U.S. Application Data

(63) Continuation of application No. PCT/CN2010/070960, filed on Mar. 10, 2010.

(30) Foreign Application Priority Data

Mar. 16, 2009  (CN) .......................... 2009 1 0118793

(51) Int. Cl.
  *H05K 1/11*  (2006.01)
(52) U.S. Cl.
  USPC ............... 361/788; 711/5; 710/104; 710/300; 439/61; 439/108; 439/540.1; 370/353; 370/363; 370/364; 370/376; 370/389; 370/394; 370/395.1; 370/463; 370/466; 370/522
(58) Field of Classification Search
  USPC ......... 361/788; 711/5; 710/104, 300; 439/61, 439/108, 540.1; 370/353, 363, 364, 376, 370/389, 394, 395.1, 463, 466, 522
See application file for complete search history.

(56) References Cited

U.S. PATENT DOCUMENTS 5,353,243 A * 10/1994 Read et al. .................. 703/2
5,416,776 A *  5/1995 Panzarella et al. ............ 370/463

(Continued)

FOREIGN PATENT DOCUMENTS

| CN | 1722933 A | 1/2006 |
| CN | 2790078 Y | 6/2006 |

(Continued)

OTHER PUBLICATIONS

Translation of First Chinese Office Action of Chinese Application No. 200910118793.6 dated Mar. 30, 2012; 5 pages.

(Continued)

*Primary Examiner* — Xiaoliang Chen

(57) ABSTRACT

The embodiments of the present invention disclose a backplane and backplane system. The backplane includes at least two service slots with the same function and an exchange slot. Among the pins of different service slots with the same function respectively connected to the exchange slot, at least two pins are arranged to resemble a stepped form. When arranged in this manner, the distribution and orientation of the connection lines connecting the pins of the service slots with the same function to the exchange slot may be adjusted, and wiring density within a single wiring layer may be increased, which therefore enables the connection lines between the service slots and the exchange slot to be staggered from each other in less wiring layers or even one wiring layer, and as a result, decreases the number of the wiring layers to be used, and reduces the costs of the backplane.

8 Claims, 8 Drawing Sheets

(56) References Cited

U.S. PATENT DOCUMENTS

| | | | | |
|---|---|---|---|---|
| 5,437,019 | A * | 7/1995 | Brockmann | 711/5 |
| 5,625,580 | A * | 4/1997 | Read et al. | 703/21 |
| 5,944,541 | A * | 8/1999 | Payne | 439/108 |
| 6,055,430 | A * | 4/2000 | Cooper et al. | 455/445 |
| 6,273,730 | B1 * | 8/2001 | Chang | 439/61 |
| 6,289,405 | B1 * | 9/2001 | Movall et al. | 710/104 |
| 6,351,633 | B1 * | 2/2002 | Meakes | 455/403 |
| 6,421,718 | B1 * | 7/2002 | Lamkin et al. | 709/223 |
| 6,522,648 | B1 * | 2/2003 | Heering et al. | 370/363 |
| 6,621,828 | B1 * | 9/2003 | Field et al. | 370/466 |
| 6,628,657 | B1 * | 9/2003 | Manchester et al. | 370/395.1 |
| 6,760,327 | B1 * | 7/2004 | Manchester et al. | 370/364 |
| 6,778,529 | B1 * | 8/2004 | Field et al. | 370/353 |
| 6,822,960 | B1 * | 11/2004 | Manchester et al. | 370/394 |
| 6,920,156 | B1 * | 7/2005 | Manchester et al. | 370/522 |
| 6,944,153 | B1 * | 9/2005 | Buckland et al. | 370/376 |
| 7,636,358 | B1 * | 12/2009 | Manchester et al. | 370/394 |
| 7,978,692 | B2 * | 7/2011 | He | 370/389 |
| 2001/0012726 | A1 * | 8/2001 | O'Neal et al. | 439/540.1 |
| 2003/0048854 | A1 * | 3/2003 | Kaku | 375/240.29 |
| 2003/0056049 | A1 * | 3/2003 | Kaku | 710/300 |
| 2003/0147375 | A1 | 8/2003 | Goergen et al. | |
| 2005/0154550 | A1 * | 7/2005 | Singh et al. | 702/108 |
| 2009/0182922 | A1 | 7/2009 | Du | |
| 2010/0283505 | A1 * | 11/2010 | Koch et al. | 326/41 |
| 2011/0055449 | A1 * | 3/2011 | Koch et al. | 710/306 |

FOREIGN PATENT DOCUMENTS

| | | |
|---|---|---|
| CN | 201008158 Y | 1/2008 |
| CN | 101217379 A | 7/2008 |

OTHER PUBLICATIONS

Written Opinion of the International Searching Authority dated Jun. 17, 2010 in connection with Internatiuonal Patent Application No. PCT/CN2010/070960.

International Search Report dated Jun. 17, 2010 in connection with International Patent Application No. PCT/CN2010/070960.

* cited by examiner

BACKPLANE AND BACKPLANE COMMUNICATION SYSTEM

CROSS-REFERENCE TO RELATED APPLICATIONS

This application is a continuation of International Application No. PCT/CN2010/070960, filed on Mar. 10, 2010, which claims priority to Chinese Patent Application No. 200910118793.6, filed on Mar. 16, 2009, both of which are hereby incorporated by reference in their entireties.

TECHNICAL FIELD

The present invention relates to the field of communications, in particular to a backplane and backplane communication system.

BACKGROUND

A backplane is an important component of a communication device. It provides an electrical connection and physical support for each single board, module, etc. A backplane is made up of plural layers of print circuit boards and connectors. It usually comprises a plurality of slots of different functions. Each single board is inserted into a slot for providing services.

The arrangement manner of the slot pins of a backplane interfacing with single boards is called backplane PINMAP. The pin arrangement manner directly affects the interface design of the single board and the backplane and decides the wiring scheme of the backplane.

The arrangements of pin positions of the service slots for achieving the same function in a backplane are usually consistent. These pin positions are deployed on the same wiring layer, and the connection lines between pins of each slot and corresponding pins of other slots should not intersect.

In studying and practicing the prior arts, the inventors of the present invention encounter the following problems:

Because the backplane area is limited, especially in areas where slot pins are relatively densely distributed, to prevent the connection lines between pins of each slot and other slots from intersecting with each other, it is necessary to use plural wiring layers to isolate each connection lines into different planar layers, which as a result increases the costs of the backplane.

SUMMARY

The technical problem to be solved by the embodiments of the present invention is to provide a backplane and backplane communication system so that by using less wiring layers the connection lines for connecting the pins of each slot with the same function to a exchange slot may be staggered from each other.

To solve the technical problem, the embodiments of the present invention are realized by the following technical solutions.

A backplane comprises at least two service slots with the same function and a exchange slot, wherein among pins of different service slots with the same function respectively connected to the exchange slot, at least two pins are arranged to resemble a stepped form.

A backplane communication system comprises a backplane and a single board, the backplane comprising at least two service slots with the same function and a exchange slot, wherein among pins of different service slots with the same function respectively connected to the exchange slot, at least two pins are arranged to resemble a stepped form, and the arrangement order of the pins of a single board being the same as the arrangement order of the pins of the backplane slot into which the single board is to be inserted.

As may be seen from the above technical solutions, in the embodiments of the present invention, among pins of multiple service slots with the same function respectively connected to the exchange slot, at least two pins are arranged to resemble a stepped form, so that the distribution and orientation of the connection lines, which connect the pins of the service slots with the same function to the exchange slot, may be adjusted, and wiring density within a single wiring layer may be increased, which therefore enables the connection lines between the service slots and the exchange slot to be staggered from each other with less wiring layers, and as a result, reduces the number of wiring layers to be used and lowers the costs of the backplane.

BRIEF DESCRIPTION OF THE DRAWINGS

To better illustrate the technical solutions of the embodiments of the present invention, the accompanying drawings used in describing the embodiments are briefly introduced in the following. Obviously, these accompanying drawings are merely some embodiments of the present invention. For those skilled in the art, other drawings may be obtained according to these accompanying drawings without creative efforts.

DETAILED DESCRIPTION

In the following, references are made to the accompany drawings of the embodiment of the present invention to clearly and fully describe the technical solutions of the embodiments of the present invention. Obviously, the described embodiments are only a part, but not all, of the embodiments of the present invention. All other embodiments obtained without creative efforts by those skilled in the art based upon the embodiments of the present disclosure fall within the protection scope of the present invention.

Figure 1:
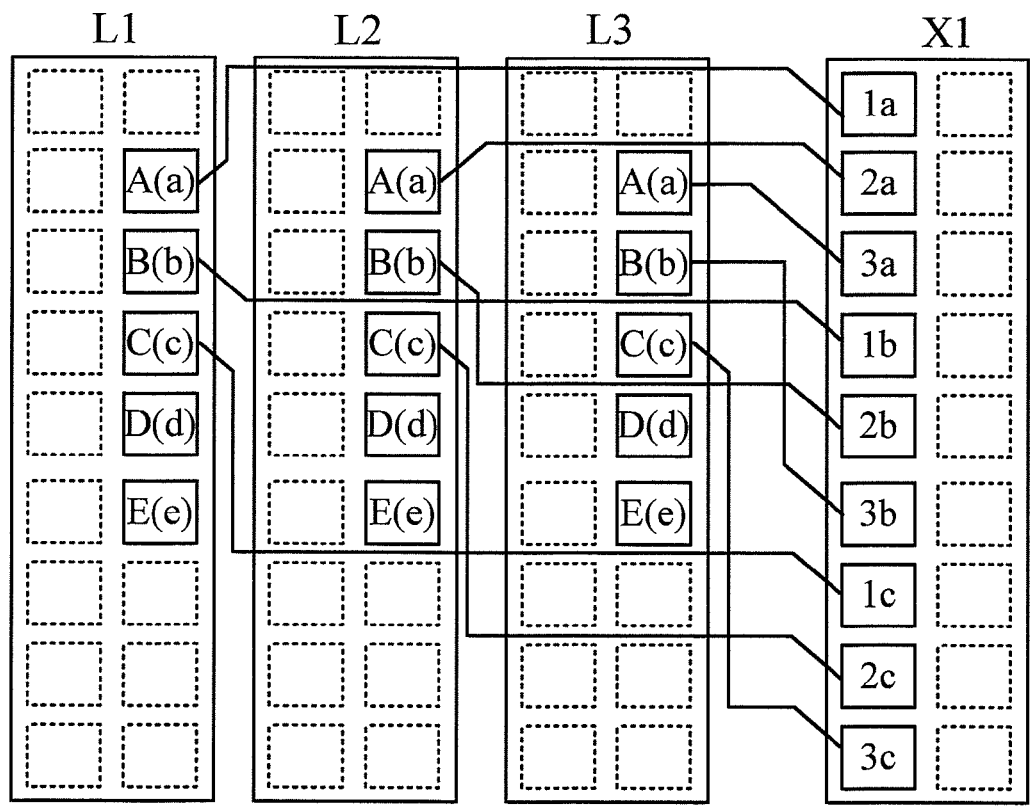
FIG. 1 is a schematic diagram describing the connection of the slot pins of the prior art.

In the prior art, the arrangements of pin positions of the service slots for achieving the same function in a backplane are usually consistent, in that the pins of the service slots with the same function for connecting to an exchange slot are deployed at the same position on the same column and the same row. For example, as shown in FIG. 1, pins B of the service slots L1, L2, and L3 are all located at row 2 column 2. That is, pins B of these three slots are at the same location. Obviously, pins A, C, and D of these three service slots are also at the same location.

The pins of each service slot with the same function connected to the exchange slot are all located at the second to the fourth positions of the second column, which leads to that the connection lines between the service slots with the same function and the exchange slot are densely distributed and may not be staggered from each other on the same wiring layer.

In the present invention, however, by making the position of a pin of at least a service slot different from the positions of the pins of other service slots with the same function, the distribution and orientation of the connection lines, which connect the pins of service slots with the same function to an exchange slot, may be adjusted, and wiring density within a single wiring layer may be increased, which therefore enables the connection lines between the service slots and the exchange slot to be staggered from each other with less wiring layers, reduces the number of the wiring layers, and lowers the costs associated with a backplane.

In the following, the present invention is described in detail by using some device embodiments.

Embodiment 1

A backplane comprises at least two service slots with the same function and an exchange slot, wherein among the different pins of the service slots with the same function respectively connected to the exchange slot at least two pins are arranged to resemble a stepped form.

In the prior art, the arrangements of pin positions of the service slots with the same function connected to an exchange slot are the same. In the embodiments of the present invention, by changing the position of a pin, such as connecting the signal corresponding to a pin B of a service slot L1 in FIG. 1 to a pin E, in particular arranging at least two pins, out of different pins of the service slots with the same function respectively connected to the exchange slot, to resemble a stepped form, so that the distribution and orientation of corresponding connection lines maybe adjusted, which enables the connection lines between the service slots and the exchange slot to be staggered from each other with less wiring layers, and as a result, increases the wiring density within a single wiring layer, and reduces the number of the wiring layers.

Stepped arrangement refers to that the pins of service slots with the same function connected to an exchange slot resemble a successively ascending or a successively descending trend. For example, the pins of service slots L1, L2, and L3 for connecting to a exchange slot are respectively at position A, B, C, or at position A, C, E, or at position C, B, A, etc. All these arrangements belong to stepped arrangement, and specific rules for this kind of arrangement are set forth in following embodiments 2 to 6.

Obviously, it is necessary to change the mapping relationship between signals and pins when changing the arrangement of the pins for connecting to an exchange slot. In the following embodiments 2 to 4 of the present invention, signal a is a signal for connecting to an exchange slot. Pins in the exchange slot for connecting to different service slots are for example named as 1a, 2a, 3a, and 4a.

The service slots and the exchange slot in a backplane may be located at the same row or at different rows. In particular, the position relation between these two kinds of slots are:

A. the service slots with the same function and the exchange slot are located at the same row of the backplane;

B. the exchange slot is higher than the service slots with the same function by one row;

C. the exchange slot is lower than the service slots with the same function by one row.

No matter which position relation exists between the service slots with the same function and the exchange slot, the implementation of the embodiments of the present invention is not affected. In the following embodiments of the present invention, rules for arrangement of the pins may be applied to a scenario where the service slots with the same function are distributed on two sides of the exchange slot.

In the following description, plural embodiments are classified according to different position relations. Wherein, embodiment 2 and embodiment 3 are about a scenario where the service slots with the same function and the exchange slot are located at the same row of the backplane; embodiment 4 is about a scenario where the exchange slot is higher than the service slots with the same function by one row; embodiment 5 is about a scenario where the exchange slot is lower than the service slots with the same function by one row; and embodiment 6 is about the scenario where there are two pins for connecting to the exchange slot in the same service slot, when the service slots with the same function and the exchange slot are not located at the same row of the backplane.

Embodiment 2

When the service slots with the same function and a exchange slot are located at the same row of the backplane, the pins in the service slots with the same function for connecting to the exchange slot are arranged as:

Pins of the at least two service slots with the same function for connecting to the exchange slot are located at the $n+q^{th}$ position in the same column of respective service slot, where q is a location lagging number of the first pin connected to the exchange slot, the first pin connected to the exchange slot is located in the service slot with a minimum n, n is the difference between m and d, m is a total number of the service slots with the same function on a side of the exchange slot, d is the number of the service slots with the same function by which the present service slot is spaced from the exchange slot, n and m are positive integers, and d and q are integers no less than 0.

The location lagging number refers to a fixed number by which the location of the first pin moves, wherein the first pin is the first pin of the service slot with a minimum n connected to the exchange slot. The location lagging number may be set flexibly according to actual needs, which does not affect the implementation of the embodiments of the present invention. For example, the pin of the service slot connected to the exchange slot is located at the second position; however, according to actual needs, the position may be increased by 3, and as a result, the pin of the service slot connected to the exchange slot is located at the $2+3=5^{th}$ position.

Figure 2:
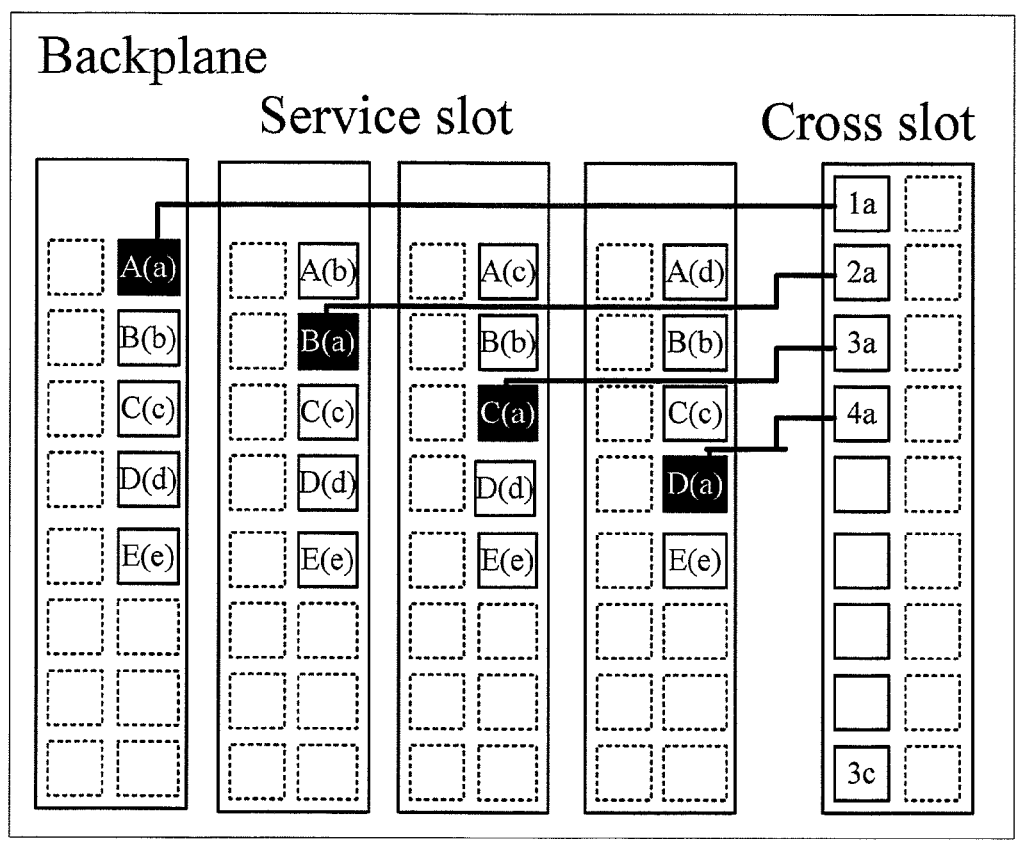
FIG. 2 is a schematic diagram describing the pin arrangement of the backplane in accordance with the second embodiment of the present invention.

Taking a backplane with four service slots with the same function on a side of an exchange slot as an example (m=4), as shown in FIG. 2, when d=3 and q=0, n=m−d=1. That is, for a service slot spaced from the exchange slot by three service slots with the same function, the pin connected to the exchange slot is located at the $n+q=1+0=1^{st}$ position of a certain column. When d=2 and q=0, n=m−d=2. That is, for a service slot spaced from the exchange slot by two service slots with the same function, the pin connected to the exchange slot is located at the $n+q=2+0=2^{nd}$ position of a certain column. In this way, for a service slot spaced from the exchange slot by one service slot with the same function, the pin connected to the exchange slot is located at the $n+q=3+0=3^{rd}$ position of a certain column. For a service slot spaced from the exchange slot by 0 service slot with the same function, the pin connected to the exchange slot is located at the $n+q=4+0=4^{th}$ position of a certain column. As may be seen from FIG. 2, the numbering of the arranged locations of the pins in the service slots with the same function connected to the exchange slot and the value of n have the same variation pattern. This kind of arrangement is called incremental arrangement.

Alternatively, when the service slots with the same function and the exchange slot are located at the same row of the backplane, the pins of the service slots with the same function connected to the exchange slot are arranged as:

Pins of the at least two service slots with the same function for connecting to the exchange slot are located at the $d+q+1^{th}$ position in the same column of respective service slot, where q is a location lagging number of the first pin connected to the exchange slot, the first pin connected to the exchange slot is located in the service slot with a minimum d, d is the number of the service slots with the same function by which the present service slot is spaced from the exchange slot, d and q are integers no less than 0.

Figure 3:
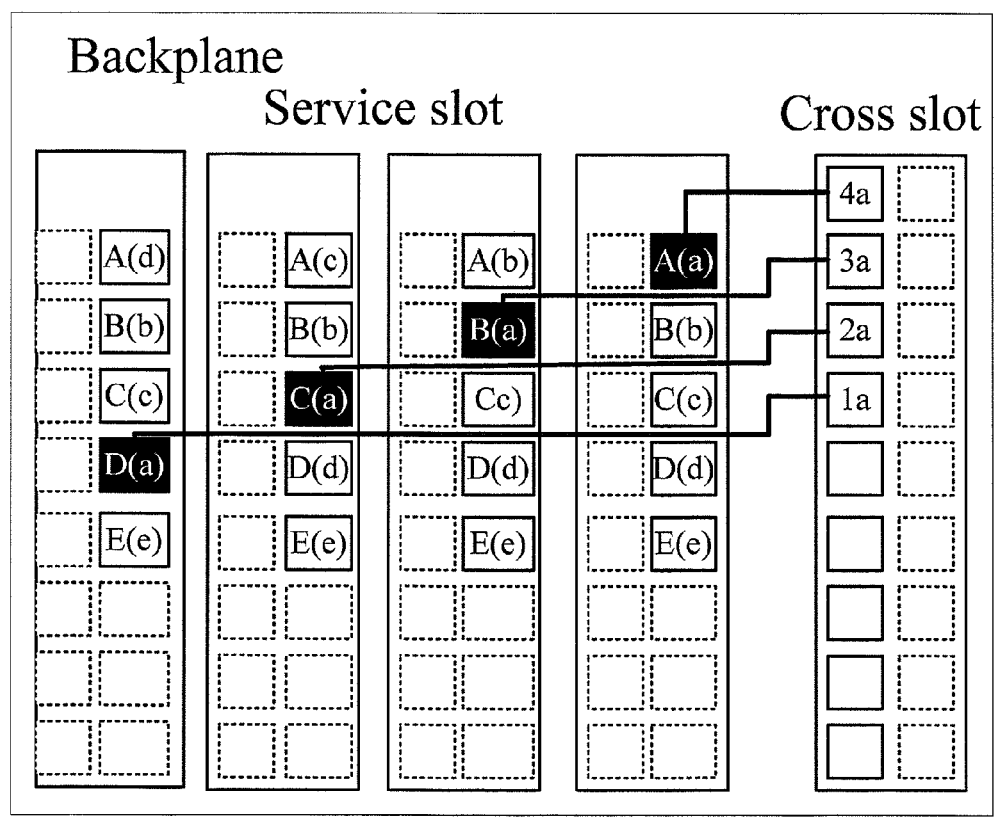
FIG. 3 is a schematic diagram describing another pin arrangement of the backplane in accordance with the second embodiment of the present invention.

Taking a backplane with four service slots with the same function on a side of a exchange slot as an example (m=4), as shown in FIG. 3, when d=2 and q=0, for a service slot spaced from the exchange slot by two service slots with the same function, the pin connected to the exchange slot is located at the $d+q+1=2+0+1=2^{nd}$ position of a certain column. When d=3 and q=0, for a service slot spaced from the exchange slot by three service slots with the same function, the pin connected to the exchange slot is located at the $d+q+1=3+0+1=4^{th}$ position of a certain column. In this way, as may be seen from FIG. 3, the numbering of the arranged locations of the pins in the service slots with the same function connected to the exchange slot and the value of n have inverse variation patterns. This kind of arrangement is called decremental arrangement.

Obviously, changing locations of the pins of the service slots with the same function connected to the exchange slot as shown in above FIG. 1 and FIG. 2 are merely examples. In fact, changing locations of the pins of arbitrary two service slots with the same function connected to an exchange slot falls within the protection scope of the present invention.

The pin arrangement in the context of the service slots with the same function and the exchange slot being located at the same row of a backplane may be applied to a scenario where the exchange slot is higher than the service slots with the same function by one row, and the location numberings of the pins in the exchange slot connected to the service slots are arranged from small to large according to the n values of the service slots; and may be applied to a scenario where the exchange slot is lower than the service slots with the same function by one row, and the location numberings of the pins in the exchange slot connected to the service slots are arranged from large to small according to the n values of the service slots. The meaning of n is the same as the foregoing.

In the embodiment of the present invention, at least two pins, out of the pins of service slots with the same function respectively connected to a exchange slot, are arranged to resemble a stepped form, so that the distribution and orientation of corresponding connection lines may be adjusted, which therefore enables the connection lines between the service slots and the exchange slot to be staggered from each other in less wiring layers or even one wiring layer, and as a result, increases the wiring density within a single wiring layer and reduces the number of the wiring layers.

Embodiment 3

In the context of the service slots with the same function and an exchange slot being located at the same row as in embodiment 2, if there are two pins in the same column of a single service slot connected to the exchange slot in a backplane, then in the $n^{th}$ service slot with the same function, the two pins in the same column connected to the exchange slot are arranged to be n−1 positions spaced apart. The meaning of n is the same as the foregoing.

Figure 4:
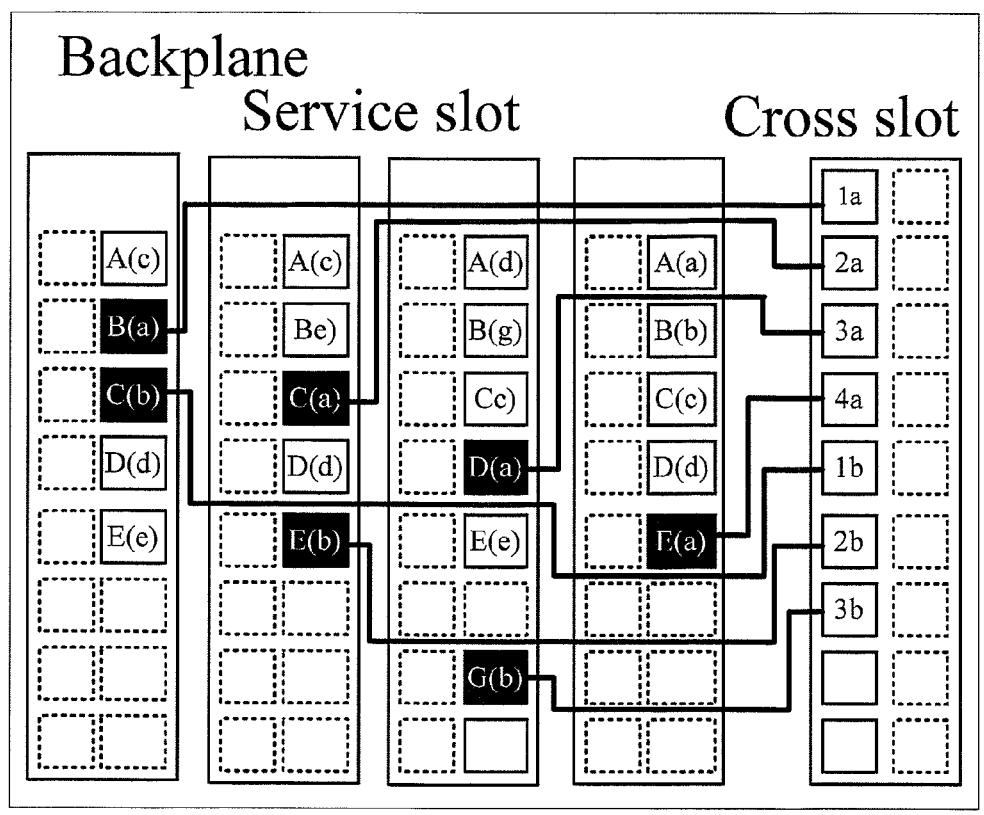
FIG. 4 is a schematic diagram describing the pin arrangement of the backplane in accordance with the third embodiment of the present invention.

For example, in the service slot where n=2, the pins in the same column connected to the exchange slot are arranged to be one position spaced apart, that is, tn−1=2−1=1. As shown in FIG. 4, signals a and b are signals for connecting the exchange slot, and pins in the exchange slot respectively connected to different service slots are for example named as 1a, 2a, 3a, and 4a. Taking a backplane having four service slots with the same function on a side of the exchange slot as an example (m=4), the service slots and the exchange slot being located at the same row, when d=3 and q=1, n=m−d=1, that is, for a service slot spaced from the exchange slot by three service slots with the same function, its first pin connected to the exchange slot is located at the $n+q=1+1=2^{nd}$ position of a certain column, and its second pin connected to the exchange slot is arranged to be n−1=1−1=0 position away from the $2^{nd}$ position, i.e., the $3^{rd}$ position of the same column. When d=2 and q=1, n=m−d=2, that is, for a service slot spaced from the exchange slot by two service slots with the same function, its first pin connected to the exchange slot is located at the $n+q=2+1=3^{rd}$ position of a certain column, and its second pin connected to the exchange slot is arranged to be n−1=2−1=1 position away from the $3^{rd}$ position, i.e., the $5^{th}$ position of the same column. In this way, the pin arrangement ultimately obtained is illustrated in FIG. 4.

Obviously, changing locations of the pins of each service slot with the same function connected to the exchange slot as shown in FIG. 4 is only one example. In fact, changing locations of the pins of arbitrary two service slots with the same function connected to a exchange slot falls within the protection scope of the present invention.

Embodiment 4

When an exchange slot is higher than the service slots with the same function by one row, and location numberings of the pins of the exchange slot connected to the service slots with the same function are arranged from large to small according to the n values of the service slots, the pins of the service slots with the same function connected to the exchange slot are arranged as follows, where n is the difference between the total number of service slots with the same function on a side of the exchange slot and the number of service slots with the same function by which the present service slot is spaced from the exchange slot.

Pins of the at least two service slots with the same function for connecting to the exchange slot are located at the $p+q+1^{th}$ position in the same column of respective service slot, where q is a location lagging number of the first pin connected to the exchange slot, the first pin connected to the exchange slot is located in the service slot with a minimum p, p refers to the number of service slots with the same function by which the present service slot is spaced from the exchange slot in the vertical direction of the exchange slot, and p and q are integers no less than 0.

Figure 5:
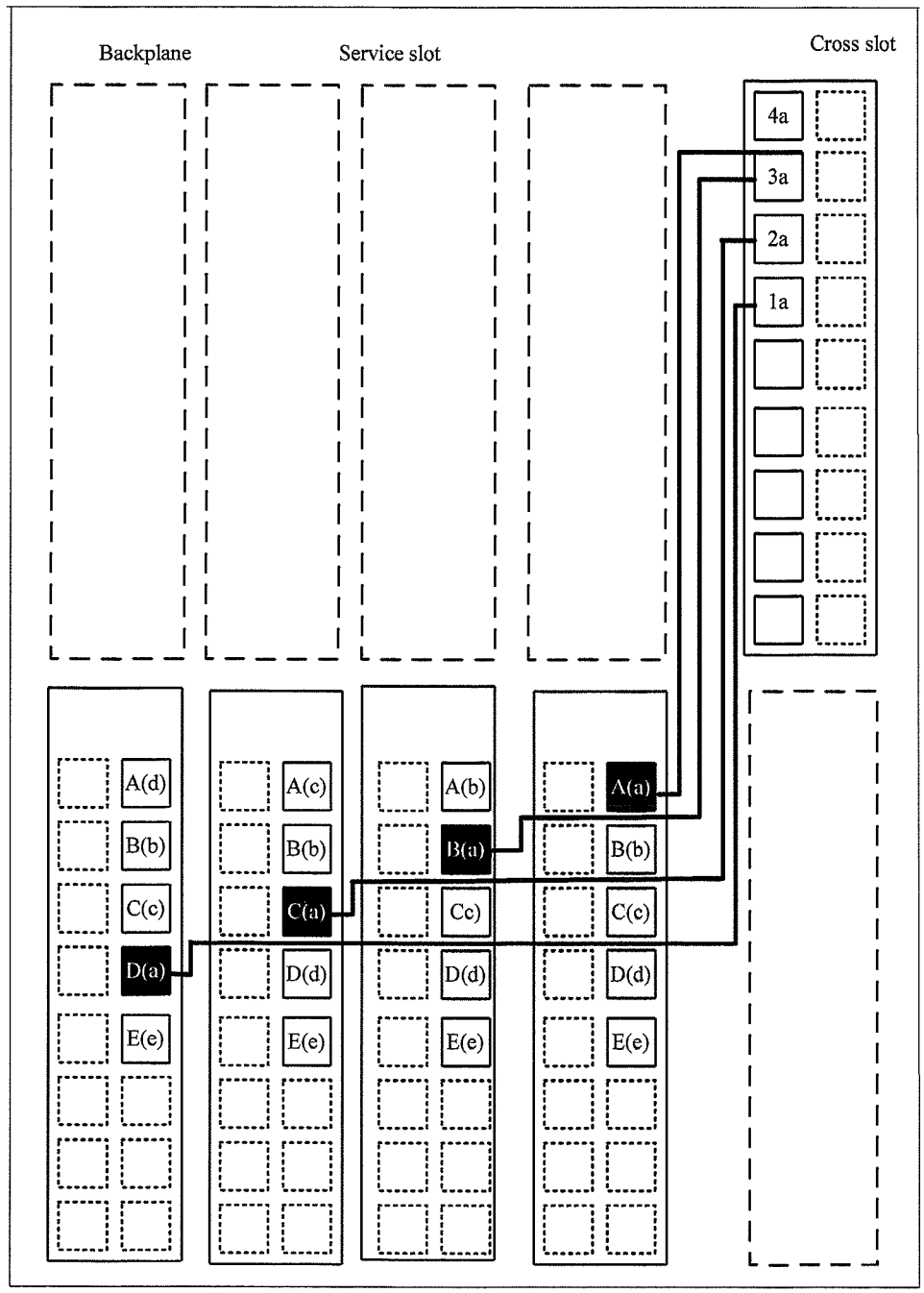
FIG. 5 is a schematic diagram describing the pin arrangement of the backplane in accordance with the fourth embodiment of the present invention.

For example, taking a backplane having four service slots with the same function on a side of the exchange slot as an example (m=4), as shown in FIG. 5, when p=2 and q=0, that is, for a service slot spaced from the exchange slot by two service slots with the same function in the vertical direction of the exchange slot, its pin connected to the exchange slot is located at the p+q+1=2+0+1=$3^{rd}$ position of a certain column. In this way, as may be seen in FIG. 5, when location numberings of the pins of the service slots with the same function connected to the exchange slot are arranged to be decremental, the connection lines between the service slots and the exchange slot may be staggered from each other with less wiring layers, which therefore increases the wiring density within a single wiring layer and reduces the number of the wiring layers to be used.

Obviously, changing locations of the pins of each service slot with the same function connected to the exchange slot as shown in FIG. 5 is only one example. In fact, changing locations of the pins of arbitrary two service slots with the same function connected to a exchange slot falls within the protection scope of the present invention.

Embodiment 5

When an exchange slot is lower than the service slots with the same function by one row, and location numberings of the pins in the exchange slot connected to the service slots are arranged from small to large according to the n values of the service slots, the pins of the service slots with the same function connected to the exchange slot are arranged as follows, where the meaning of n is the same as the foregoing.

Pins of at the least two service slots with the same function for connecting to the exchange slot are located at the n+q$^{th}$ position in the same column of respective service slot, where q is a location lagging number of the first pin connected to the exchange slot, the first pin connected to the exchange slot is located in the service slot with a minimum n, p refers to the number of service slots with the same function by which the present service slot is spaced from the exchange slot in the vertical direction of the exchange slot, and p and q are integers no less than 0. The meaning of n is the same as the foregoing.

Figure 6:
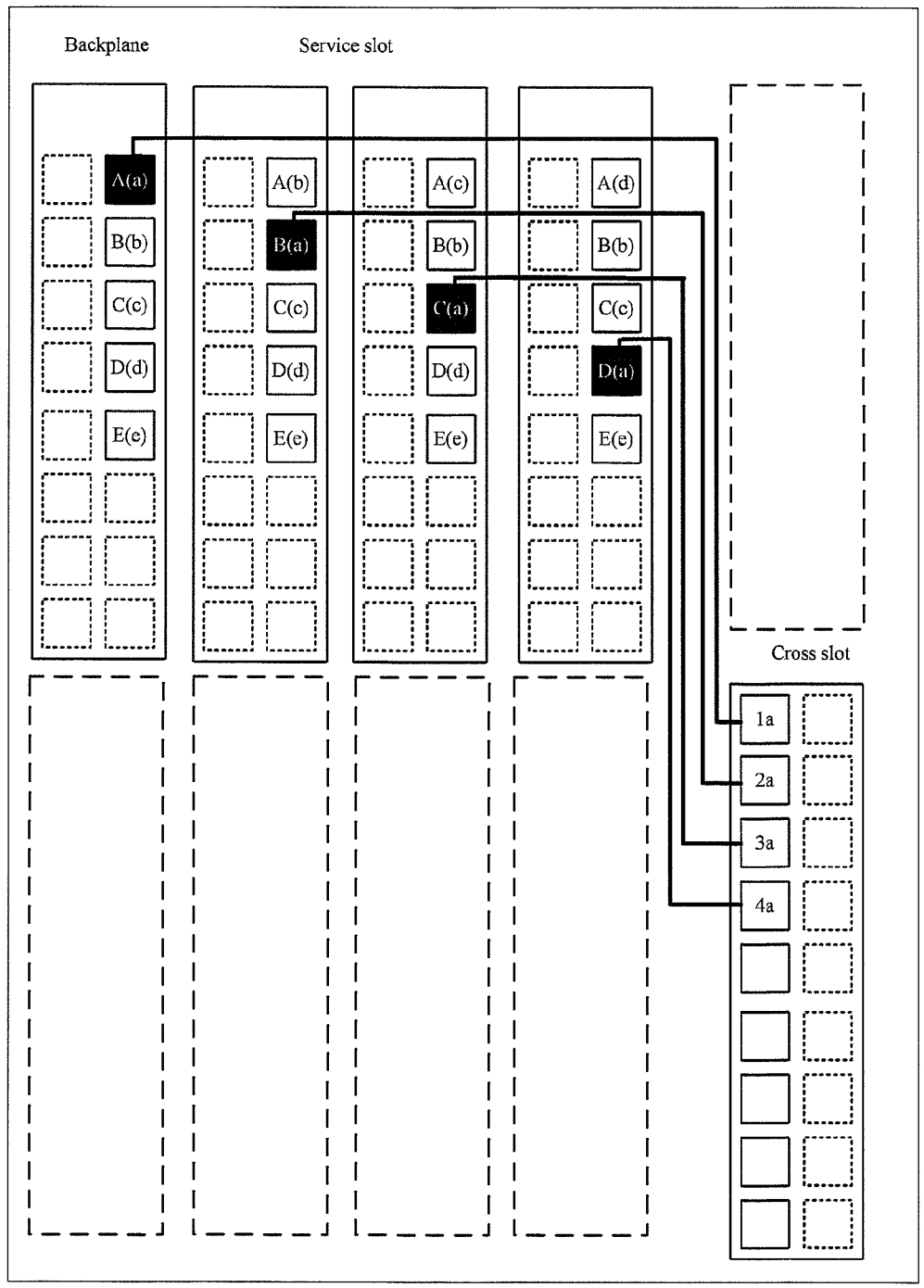
FIG. 6 is a schematic diagram describing the pin arrangement of the backplane in accordance with the fifth embodiment of the present invention.

For example, taking a backplane having four service slots with the same function on a side of the exchange slot as an example (m=4), as shown in FIG. 6, when p=3 and q=0, n=m−p=1. That is, for a service slot spaced from the exchange slot by three service slots with the same function, its pin connected to the exchange slot is located at the n+q=1+0=$1^{st}$ position of a certain column. In this way, as may be seen in FIG. 6, when location numberings of the pins of the service slots with the same function connected to the exchange slot are arranged to be incremental, the connection lines between the service slots and the exchange slot may be staggered from each other with less wiring layers, which therefore increases the wiring density within a single wiring layer and reduces the number of the wiring layers to be used.

Obviously, changing locations of the pins of each service slot with the same function connected to the exchange slot as shown in FIG. 6 is only one example. In fact, changing locations of the pins of arbitrary two service slots with the same function connected to a exchange slot falls within the protection scope of the present invention.

In the following embodiment 6, given the location arrangements as shown in embodiment 4 and embodiment 5, a pin arrangement is provided for a scenario where there are two pins connected to a exchange slot in a service slot of a backplane.

Embodiment 6

In the context of the service slots with the same function and an exchange slot are not located at the same row as shown in FIG. 4 and FIG. 5, if there are two pins connected to the exchange slot in a single service slot of a backplane, then in each service slot with the same function, its two pins in the same column connected to the exchange slot are spaced from each other by m−2 positions, wherein m refers to a total number of the service slots with the same function on a side of the exchange slot.

Figure 7:
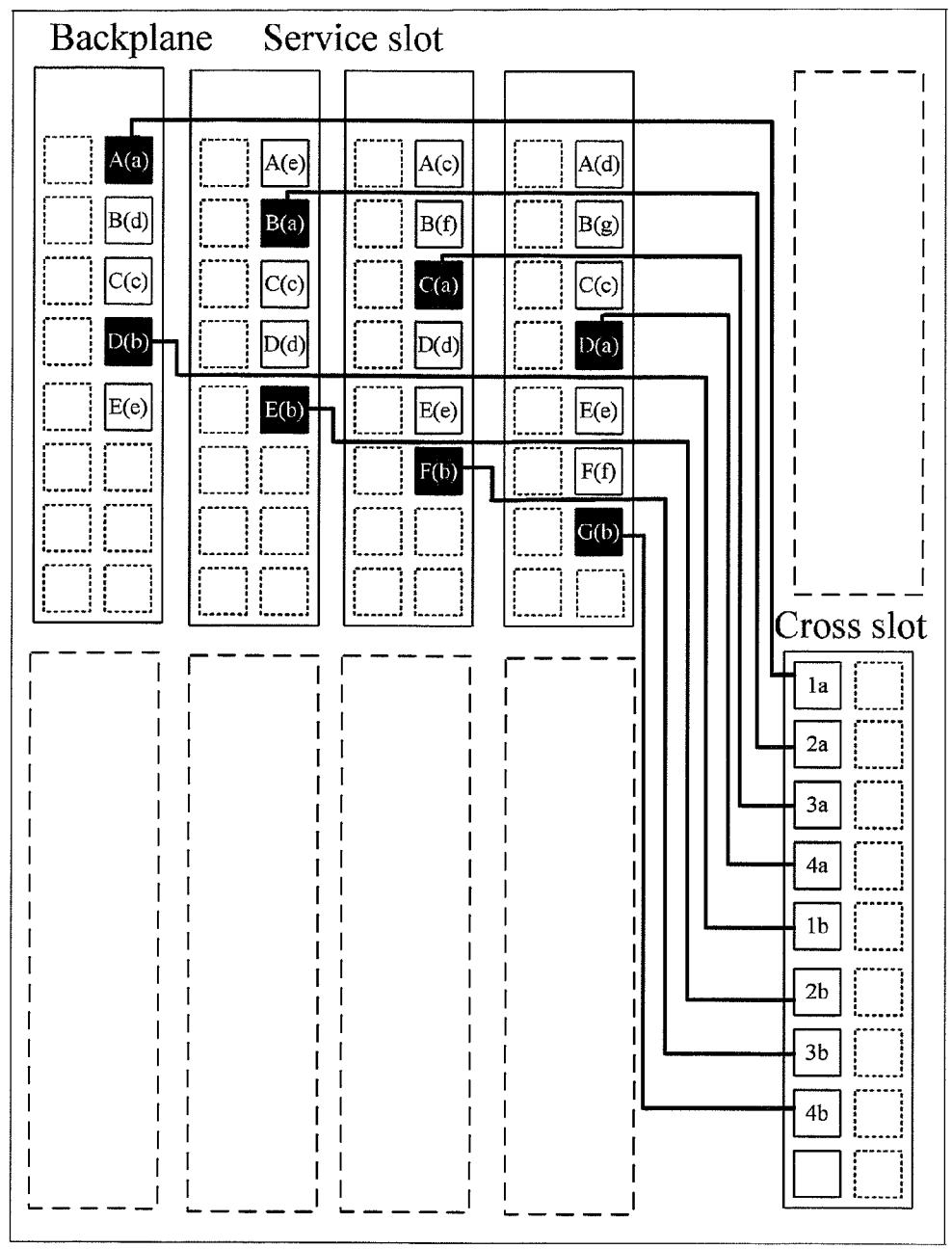
FIG. 7 is a schematic diagram describing the pin arrangement of the backplane in accordance with the sixth embodiment of the present invention.

For example, as shown in FIG. 7, signals a and b are signals for connecting the exchange slot, and pins of the exchange slot connected to different service slots are for example named as 1*a*-4*a* and 1*b*-4*b*. Taking a backplane having four service slots with the same function on a side of the exchange slot as an example (m=4), the service slots and the exchange slot being located at the same row, m−2=2, then in each service slot, the two pins in the same column connected to the exchange slot are spaced from each other by two positions. For example, if the first pin connected to the exchange slot is at the third position of the column, the second pin connected to the exchange slot is at the sixth position spaced from the third position by two positions. The ultimately obtained pin arrangement is as shown in FIG. 7.

Obviously, changing locations of the pins of each service slot with the same function connected to the exchange slot as shown in FIG. 7 is only one example. In fact, changing locations of the pins of arbitrary two service slots with the same function connected to a exchange slot falls within the protection scope of the present invention.

The pin arrangements in the embodiments of the present invention as described above are merely examples. Arranging the pins in other manners does not affect the implementation of the present invention. The pin arrangements in the embodiments of the present invention as described above may be applied to a scenario where the service slots with the same function are distributed on both sides of the exchange slot.

Obviously, a single board inserted into a slot where the pin arrangement has been altered should be configured according to the pin arrangement of the slot. This configuration may be carried out by using software.

In the embodiments of the present invention, by arranging at least two pins, out of the pins of plural service slots with the same function respectively connected to an exchange slot, to resemble a stepped form, the distribution and orientation of the connection lines connecting the pins of the service slots with the same function to the exchange slot may be adjusted, and the wiring density within a single wiring layer may be increased, which therefore enables the connection lines between the service slots and the exchange slot to be staggered from each other in less wiring layers or even one wiring layer.

The embodiments of the present invention also provide a backplane communication system.

Figure 8:
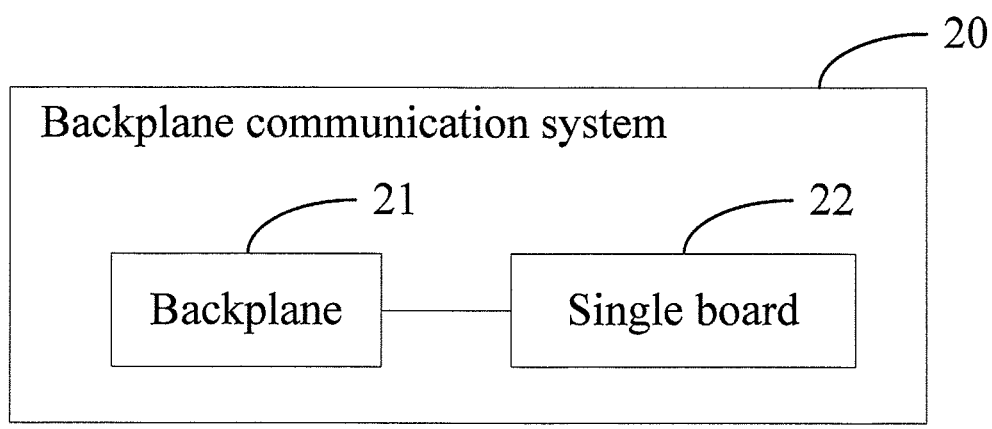
FIG. 8 is a schematic diagram describing the structure of the backplane communication system in accordance with the embodiments of the present invention.

A backplane communication system 20 is as shown in FIG. 8. FIG. 8 is a schematic diagram describing the structure of the backplane communication system of the embodiments of the present invention, which comprises a backplane 21 and a single board 22.

The backplane 21 comprises plural service slots with the same function and an exchange slot. Among the plural service slots with the same function, at least two pins out of the pins respectively connected to the exchange slot are arranged to resemble a stepped form.

The pin arrangement of the single board 22 is the same as the pin arrangement of the slot of the backplane 21 into which the single board is to be inserted.

The pin arrangements for the pins of the service slots with the same function connected to the exchange slot in backplane 21 are the same as the foregoing.

When the service slots with the same function and an exchange slot are located at the same row of the backplane, in backplane 21, pins of the at least two service slots with the same function connected to the exchange slot are located at the $n+q^{th}$ position in the same column of respective service slot, where q is a location lagging number of the first pin connected to the exchange slot, the first pin connected to the exchange slot is located in the service slot with a minimum n, and the meaning of n is the same as the foregoing; or pins of the at least two service slots with the same function connected to the exchange slot are located at the $d+q+1^{th}$ position in the same column of respective service slot, where q is a location lagging number of the first pin connected to the exchange slot, the first pin connected to the exchange slot is located in the service slot with a minimum d, d refers to the number of service slots with the same function by which the present service slot is spaced from the exchange slot in the vertical direction of the exchange slot, and d and 1 are positive integers no less than 0; in backplane 21, two pins in the same column of the $n^{th}$ service slot with the same function are spaced from each other by n−1 positions, and the meaning of n is the same as the foregoing.

When the exchange slot is higher than the service slots with the same function by one row, and the pins of the exchange slot connected to the service slots are arranged from large to small according to the n values of the service slots, pins of the at least two service slots with the same function connected to the exchange slot are located at the $p+q+1^{th}$ position in the same column of respective service slot, where the meanings of n and q are the same as the foregoing, and p refers to the number of service slots with the same function by which the present service slot is spaced from the exchange slot in the vertical direction of the exchange slot; or when the exchange slot is lower than the service slots with the same function by one row, and the pins of the exchange slot connected to the service slots are arranged from small to large according to the n values of the service slots, pins of the at least two service slots with the same function connected to the exchange slot are located at the $n+q^{th}$ position in the same column of respective service slot, and the meanings of n and q are the same as the foregoing; in each service slot with the same function, the two pins in the same column connected to the exchange slot are spaced from each other by m−2 positions. The meaning of m is the same as the foregoing.

In the embodiments of the present invention, by simultaneously adjusting the pin arrangements of the backplane and the single board, the distribution and orientation of the connection lines connecting pins of the service slots with the same function to the exchange slot may be adjusted, which therefore increases the wiring density within a single wiring layer, and as a result, enables the connection lines between the service slots and the exchange slot to be staggered from each other in less wiring layers or even one single wiring layer.

In the above embodiments, each description of corresponding embodiment has its focus. A part not detailed in one embodiment may be referred to in relevant descriptions of other embodiments.

In the above, a detailed description of the backplane and backplane communication system as provided by the embodiments of the present invention has been made. The principle and embodiments of the present invention are illustrated through specific examples. The above embodiments are merely used for understanding the method and the gist of the present invention. Meanwhile, for those skilled in the art, modifications may be made to the embodiments and application scope based on the idea of the present invention. In all, the present disclosure should not be construed as a limitation to the present invention.

What is claimed is:

1. A backplane, comprising:
at least two service slots with the same function;
an exchange slot; and
wherein among pins of different service slots with the same function for connecting to the exchange slot, at least two pins are arranged to resemble a stepped from;
wherein when the service slots with the same function and the exchange slot are located at the same row of the backplane, the pin arrangement for the pins of the service slots with the same function connected to the exchange slot specifically comprises:
in the at least two service slots with the same function, the pins connected to the exchange slot are located at the n+q th position in the same column of respective service slot, q being a location lagging number of a first pin connected to the exchange slot, the first pin connected to the exchange slot being located in the service slot with a minimum n, n being a difference between m and d, m being a total number of the service slots with the same function on a side of the exchange slot, and d being the number of the service slots with the same function by which a present service slot is spaced from the exchange slot, wherein n and m are positive integers, and d and q are integers no less than 0.

2. A backplane, comprising:
at least two service slots with the same function;
an exchange slot; and
wherein among pins of different service slots with the same function for connecting to the exchange slot, at least two pins are arranged to resemble a stepped form;
wherein when the service slots with the same function and the exchange slot are located at the same row of the backplane, the pin arrangement for the pins of the service slots with the same function connected to the exchange slot specifically comprises:
in the at least two service slots with the same function, the pins connected to the exchange slot are located at the d+q+1 th position in the same column of respective service slot, q being a location lagging number of a first pin connected to the exchange slot, the first pin connected to the exchange slot being located in the service slot with a minimum d, and d being the number of the service slots with the same function by which a present service slot is spaced from the exchange slot, wherein d and q are integers no less than 0.

3. The backplane according to claim 1, wherein in the present service slot, the two pins in the same column connected to the exchange slot are spaced from each other by n−1 positions, n being the difference between m and d, m being a total number of the service slots with the same function on a side of the exchange slot, and d being the number of the service slots with the same function by which the present service slot is spaced from the exchange slot, wherein n and m are positive integers, and d and q are integers no less than 0.

4. The backplane according to claim 2, wherein in the present service slot, the two pins in the same column connected to the exchange slot are spaced from each other by n−1 positions, n being the difference between m and d, m being a total number of the service slots with the same function on a side of the exchange slot, and d being the number of the service slots with the same function by which the present service slot is spaced from the exchange slot, wherein n and m are positive integers, and d and q are integers no less than 0.

5. A backplane, comprising:
at least two service slots with the same function;
an exchange slot; and
wherein among pins of different service slots with the same function for connecting to the exchange slot, at least two arranged to resemble a stepped form;
wherein when the exchange slot is higher than the service slots with the same function by one row, and location numberings of the pins of the exchange slot connected to the service slots are arranged from large to small according to n values of the service slots, n being a difference between m and p, m being a total number of the service slots with the same function on a side of the exchange slot, p being the number of the service slots with the same function by which a present service slot is spaced from the exchange slot in a vertical direction of the exchange slot, the pin arrangement for the pins of the service slots with the same function connected to the exchange slot specifically comprises:
in the at least two service slots with the same function, the pins connected to the exchange slot are located at the p+q+1 th position in the same column of respective service slot, q being a location lagging number of a first pin connected to the exchange slot, the first pin connected to the exchange slot being located in the service slot with a minimum p, wherein p and q are integers no less than 0.

6. A backplane, comprising:
at least two service slots with the same function;
an exchange slot; and
wherein among pins of different service slots with the same function for connecting to the exchange slot, at least two pins are arranged to resemble a stepped form;
wherein when the exchange slot is lower than the service slots with the same function by one row, and location numberings of the pins of the exchange slot connected to the service slots are arranged from small to large according to n values of the service slots, n being a difference between m and p, m being a total number of the service slots with the same function on a side of the exchange slot, p being the number of the service slots with the same function by which a present service slot is spaced from the exchange slot in a vertical direction of the exchange slot, the pin arrangement for the pins of the service slots with the same function connected to the exchange slot specifically comprises:
in the at least two service slots with the same function, the pins connected to the exchange slot are located at the n+q th position in the same column of respective service slot, q being a location lagging number of a first pin connected to the exchange slot, the first pin connected to the exchange slot being located in the service slot with a minimum p, wherein n and m are positive integers, and p and q are integers no less than 0.

7. The backplane according to claim 5, further comprising:
in each service slot with the same function, the two pins in the same column connected to the exchange slot are spaced from each other by m−2 positions, where m is a total number of the service slots with the same function on a side of the exchange slot.

8. The backplane according to claim 6, further comprising:
in each service slot with the same function, the two pins in the same column connected to the exchange slot are spaced from each other by m−2 positions, where m is a total number of the service slots with the same function on a side of the exchange slot.

* * * * *

UNITED STATES PATENT AND TRADEMARK OFFICE
CERTIFICATE OF CORRECTION

| | | |
|---|---|---|
| PATENT NO. | : 8,570,764 B2 | Page 1 of 1 |
| APPLICATION NO. | : 13/234749 | |
| DATED | : October 29, 2013 | |
| INVENTOR(S) | : Wang et al. | |

It is certified that error appears in the above-identified patent and that said Letters Patent is hereby corrected as shown below:

In the claims

Column 10, Claim 1, line 19, delete "from" and insert -- form --; and

Column 11, Claim 5, line 14, after "at least two" insert -- pins are --.

Signed and Sealed this
Ninth Day of February, 2016

Michelle K. Lee
*Director of the United States Patent and Trademark Office*